United States Patent [19]

Komatsu

[11] Patent Number: 5,041,774
[45] Date of Patent: Aug. 20, 1991

[54] BRUSHLESS MOTOR DRIVING CIRCUIT

[75] Inventor: Izumi Komatsu, Komagane, Japan

[73] Assignee: Kabushiki Kaisha Sankyo Seiki Seisakusho, Nagano, Japan

[21] Appl. No.: 413,973

[22] Filed: Sep. 28, 1989

[30] Foreign Application Priority Data

Sep. 29, 1988 [JP] Japan .................. 63-127954[U]

[51] Int. Cl.$^5$ ............................... H02P 7/06
[52] U.S. Cl. ................ 318/727; 318/254; 318/138; 318/439
[58] Field of Search ............... 318/727-819, 318/245, 138, 254, 439; 361/18-28

[56] References Cited

U.S. PATENT DOCUMENTS

| 4,167,693 | 9/1979 | Liska et al. | 318/138 |
| 4,344,023 | 8/1982 | Yokobori et al. | 318/254 A |
| 4,491,770 | 1/1985 | Gotou | 318/254 |
| 4,494,053 | 1/1985 | Gotou | 318/254 |
| 4,535,276 | 8/1985 | Yokobori | 318/254 |
| 4,544,868 | 10/1985 | Murty | 318/138 X |
| 4,546,294 | 10/1985 | Ban et al. | 318/254 |
| 4,608,524 | 8/1986 | Yokobori | 318/254 |
| 4,631,458 | 12/1986 | Furuichi | 318/254 |
| 4,633,150 | 12/1986 | Inaji et al. | 318/138 X |
| 4,712,050 | 12/1987 | Nagasawa et al. | 318/138 X |

Primary Examiner—Paul Ip
Attorney, Agent, or Firm—Wallenstein, Wagner & Hattis, Ltd.

[57] ABSTRACT

A brushless motor driving circuit includes a capacitor connected to an output terminal of a current feedback amplifier of the driving circuit to reduce electrical and mechanical noises.

5 Claims, 5 Drawing Sheets

BRUSHLESS MOTOR DRIVING CIRCUIT

FIELD OF THE INVENTION

This invention relates to an improved brushless motor driving circuit.

BACKGROUND OF THE INVENTION

An existing brushless motor driving circuit uses a switching drive circuit as shown in FIG. 8. Such a switching drive circuit for a brushless motor in general causes an electrical switching noise and a mechanical noise such as vibration of a coil caused by the switching noise, because of the following reasons.

Upon on-off actions of transistors Tr1 to Tr6 responsive to a switching signal, a driving voltage equal to the switching signal is applied to coils Lu to Lw. Due to application of the voltage to the coils, a transient response causes a high frequency component of the switching noise to ride on a current I which flows in the coils. Further, rotations of the motor causes a counter electromotive voltage in the coils, and due to changes in the counter electromotive voltage a high frequency component of a further complicated noise is superposed on the current in the coils.

The current in the coils is detected by a current detector Rs. Since the current waveform includes a lot of above-indicated noises, high frequency components of the noise are also superposed on an output of a current feedback amplifier $A_2$.

Therefore the high frequency components of the noises are also superposed on the switching signal (analog signal) whose amplitude is changed by the output signal of the current feedback amplifier $A_2$.

This means that a high frequency component (noise) is produced in the coils and amplified to a signal having a tremulously serrated waveform as shown in FIG. 9.

Since the superposed high frequency component (noise) on the current in the coils gives a bad influence to peripheral circuits, the noise must be removed.

In this regard, the driving circuit of FIG. 8 uses filters consisting of electrolytic capacitors Ccu, Ccv and Ccw and resistors Ru, Rv and Rw and connected to the driving coils Lu, Lv, Lw so as to remove such noises at the terminal end of a control loop.

This countermeasure, however, involves a drawback that a large through current I, which flows in the capacitors upon high-speed rotations of the motor, possibly destroys the capacitors, and this disables the use of the existing driving circuit for a high speed of 2000 rpm or more.

Further, when such electrolytic capacitors are used, the manufacturing cost is increased, and a considerable mounting space is occupied.

OBJECT OF THE INVENTION

It is therefore an object of the invention to provide a brushless motor driving circuit capable of reducing electrical and mechanical noises caused by sudden changes in current upon switching the conduction among driving coils and capable of omitting large-capacitance electrolytic capacitors to improve a matter of the cost and space.

SUMMARY OF THE INVENTION

According to the invention, there is provided a brushless motor driving circuit comprising:

magnetosensitive elements for detecting the rotating position of a motor by detecting the magnetic pole of a rotor magnet;

driving transistors for feeding power to driving coils of said motor;

a current feedback amplifier responsive to a current detection signal obtained by detecting a current flowing in said coils and a speed signal indicative of the rotation speed of said motor to control the amount of the current flowing in said coils;

a control circuit responsive to output signals of said magnetosensitive elements and an output of said current feedback amplifier to drive said driving transistor; and a capacitor connected to an output terminal of said current feedback amplifier.

BRIEF DESCRIPTION OF THE DRAWINGS

FIGS. 1 through 7 show embodiments of the invention in which:

FIG. 1 is a diagram of a brushless motor driving circuit;

FIG. 2 shows an output waveform of an improved control circuit;

FIGS. 3 and 4 are circuit diagrams of a modified brushless motor driving circuit;

FIG. 5 is a fragmentary cross-sectional side view of a core-attached, circumferential-opposed brushless motor in which an inventive brushless motor driving circuit is incorporated;

FIG. 6 is a plan view of a core winding and a substrate;

FIG. 7 is a plan view of the substrate;

DETAILED DESCRIPTION

Figure 1:
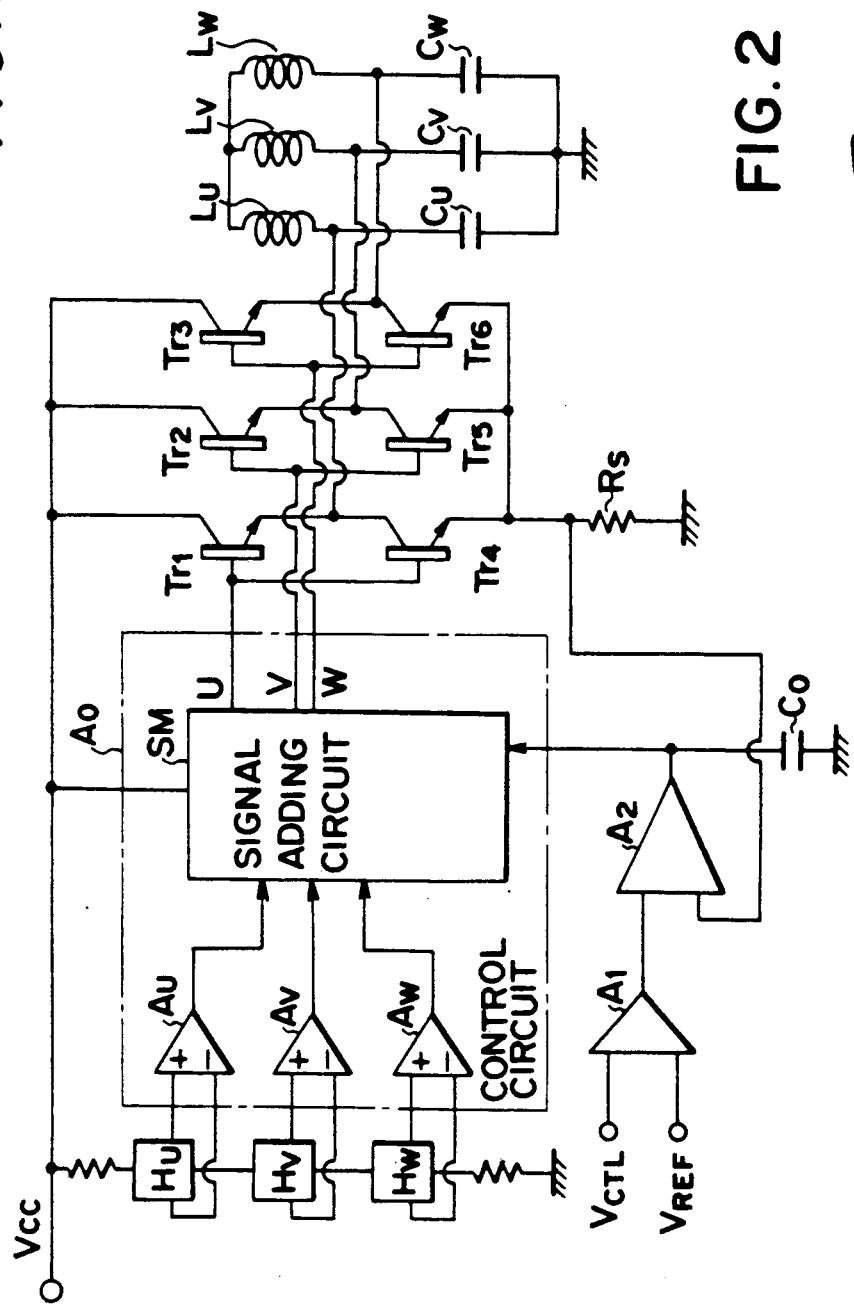
Figure 8:
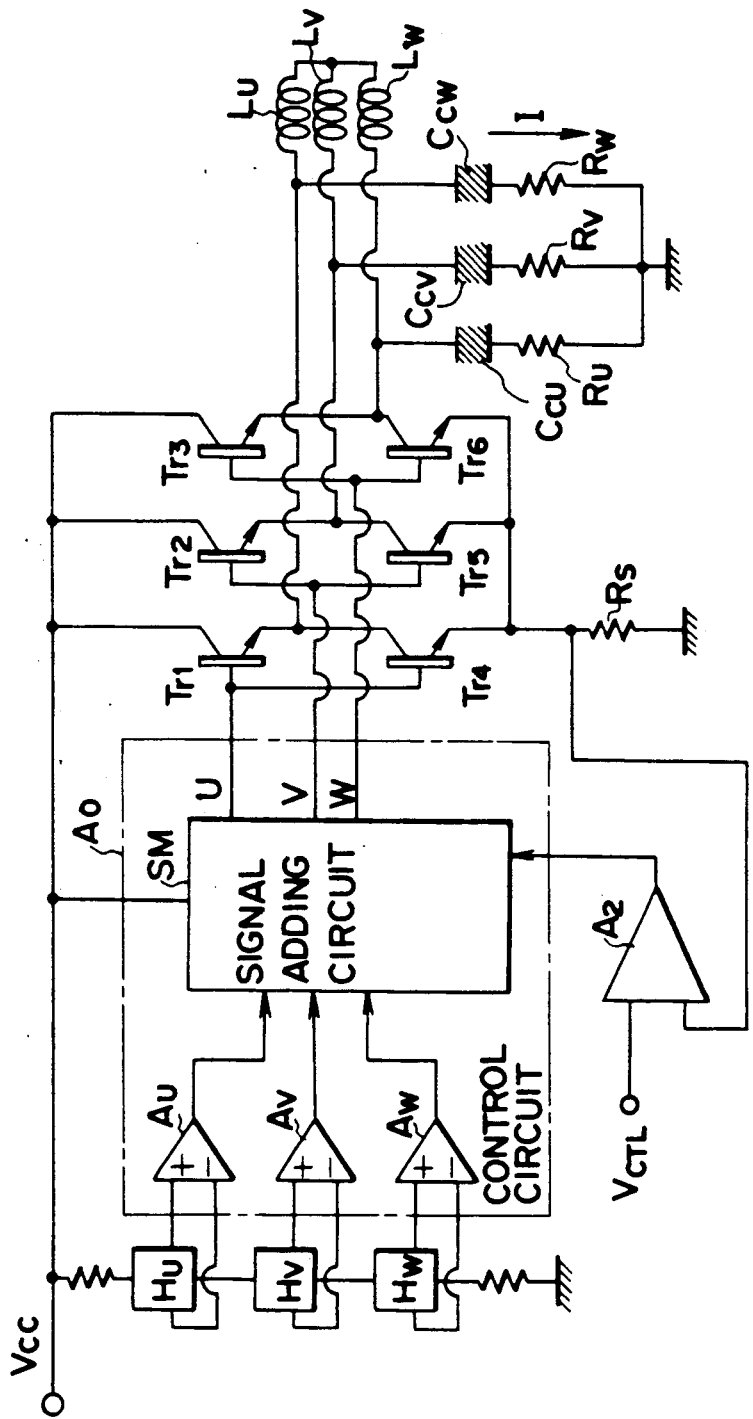
FIG. 8 is a diagram of an existing brushless motor driving circuit.

The invention is described below in detail, referring to embodiments illustrated in the drawings in which the same elements as those in FIG. 8 are designated by the same reference numerals. The brushless motor driving circuit of FIG. 1 is of a three-phase 120°-switching conduction type which consists of Hall elements Hu, Hv, Hw; driving transistors Tr1 through Tr6 for feeding power to driving coils Lu, Lv, Lw; driving coils Lu, Lw, Lw; a control circuit A for controllingly driving the driving the transistors; a differential amplifier $A_1$ in which an output voltage $V_{CTL}$ of a speed detector (not shown) and a speed instruction voltage $V_{REF}$ are entered; a current feedback amplifier $A_2$ which receives a speed signal indicative of the rotation speed of the motor from the differential amplifier $A_1$ as well as a current detection signal obtained by detecting the current flowing in the driving coils and controls the current amount which flows in the driving coils; a signal adding circuit SM in which output signals of Hall element amplifiers Au, Av, Aw and an output signal of the current feedback amplifier $A_2$ are entered; and a capacitor $C_0$ connected to the output terminal of the current feedback amplifier $A_2$.

The current which flows in the driving coils Lu, Lv, Lw is detected by a current detection resistor RS and behaves as a current detection signal.

Figure 5:
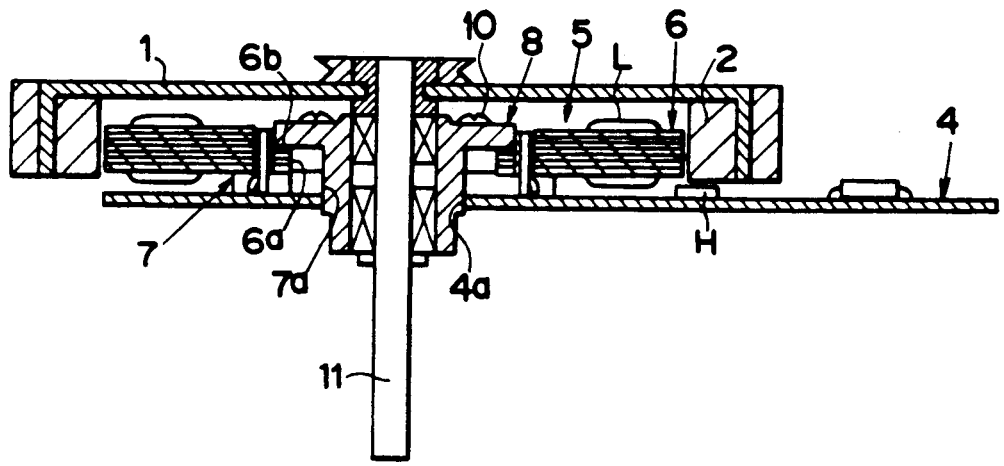
Figure 6:
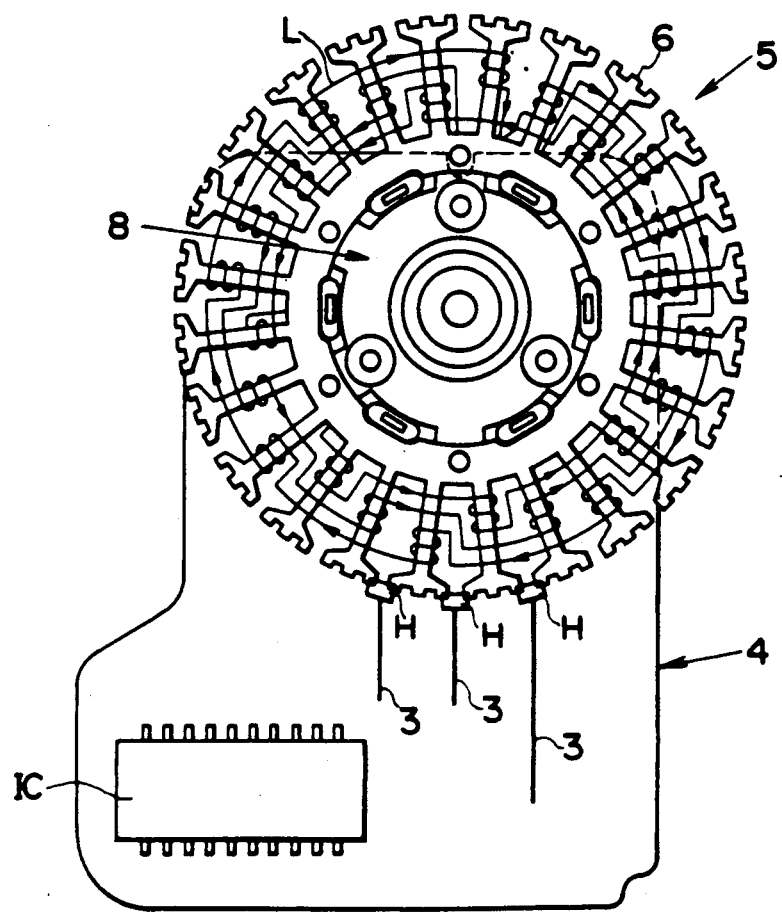
Figure 7:
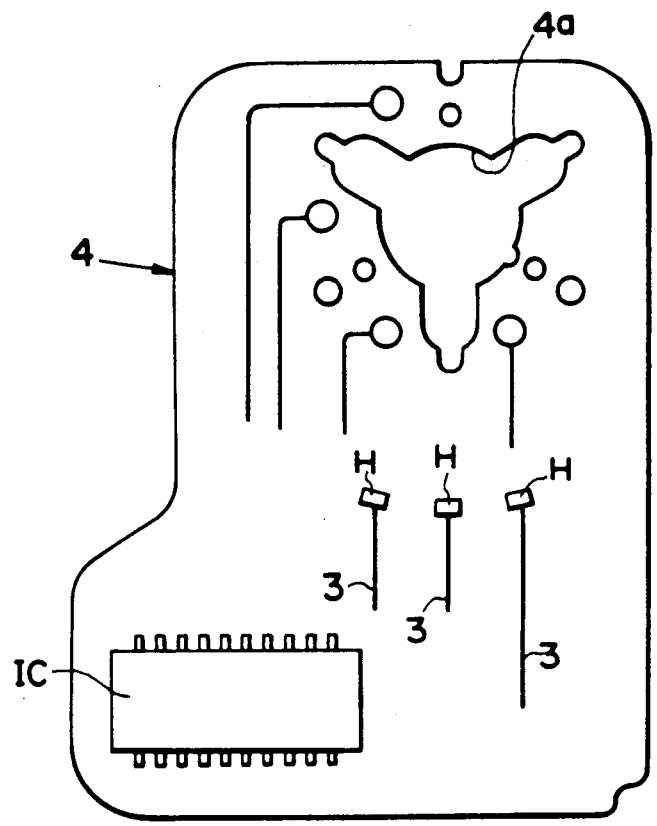
Figure 9:
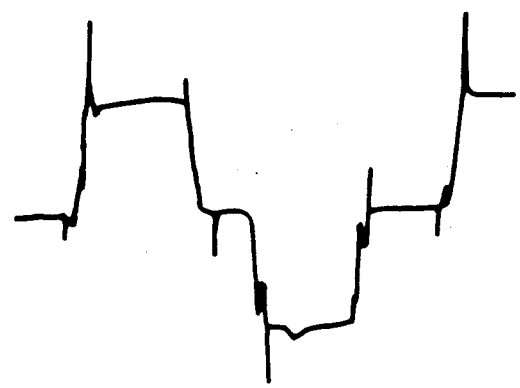
FIG. 9 shows the waveform of an output of a control circuit in the existing circuit of FIG. 8.

When the brushless motor driving circuit is used in a core-attached circumferential-opposed motor, Hall elements Hu, Hv and Hw are disposed to detect the magnetic pole of a rotor magnet 2 as shown in FIGS. 5 to 7.

The capacitance of the capacitor $C_0$ is about 0.1 μF to 10 μF although the optimum value thereof varies with motor.

The control circuit $A_0$ of FIG. 1 consists of the signal adding circuit SM and the Hall element amplifiers Au, Av and Aw. However, the Hall element amplifiers and the signal adding circuit may be arranged in the form of a single IC.

The driving coils Lu, Lv and Lw are U-phase, V-phase and W-phase coils, respectively.

The differential amplifier $A_1$ compares the output voltage $V_{CTL}$ of the speed detector with the speed instruction voltage $V_{REF}$ and outputs a speed signal.

The current feedback amplifier $A_2$ compares the output (speed signal) of the differential amplifier $A_1$ with a current detection signal which is an output (output in voltage) of the current detection resistor Rs for detecting the value of the current flowing in the driving coils Lu, Lv and Lw and amplifiers the difference so as to control the current amount to be fed to the driving coils via the driving transistors Tr1 to Tr6, depending on the speed.

That is, the current feedback amplifier $A_2$ outputs a signal (analog signal) for determining the amplitude of an output signal of the signal adding circuit SM.

The output of the current feedback amplifier $A_2$ enters in the signal adding circuit SM of the control circuit $A_0$, and based on Hall signals and the output signal of the current feedback amplifier, driving output signals for driving the driving transistors are composed. The signal adding circuit SM is controlled by the output signal of the current feedback amplifier $A_2$ to change the amplitude of its output signal.

The signal adding circuit SM behaves to determine the phases of three-phase switching signals (U, V and W phases) based on Hall element signals from the three Hall elements Hu, Hv and Hw (three signals different in phase by 120° are composed).

Further, the signal adding circuit SM includes an amplifier for amplifying the output signal (analog signal) of the current feedback amplifier $A_2$ which varies with rotation speed, and the amplitudes of the three-phase switching signals are determined by changing them in the analog basis by the amplifier in response to the output signal of the current feedback amplifier. That is, the amplitudes of the switching signals are determined by the amplitude of the output of the current feedback amplifier.

Therefore, the output signals (switching signals) of the signal adding circuit are analog signals having 120° phase difference. Their waveforms approximate to pulse configurations.

Figure 2:
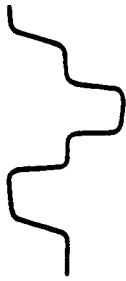

The capacitor $C_0$ is connected to the output terminal of the current feedback amplifier $A_2$, so that the high frequency component (noise) heretofore imposed on the current flowing in the coils can be cut. Therefore, the noise is not present in the output of the current feedback amplifier, and the output signals of the signal adding circuit SM, from which the high-frequency component has been removed, exhibit smooth waveforms (corner-rounded waveforms) as shown in FIG. 2.

Once the smooth waveforms of the switching signals, i.e. output signals of the signal adding circuit are established, then the transient response by the driving coils becomes moderate, and a large part of high-frequency components (noise) of the current flowing to the driving coils is reduced.

Since the capacitor $C_0$ removes the noise at a portion near the generating source, its noise removal effect is great.

When the driving circuit which connects the capacitor $C_0$ to the output terminal of the current feedback amplifier $A_2$ is used as described above, mechanical noise caused by sudden changes in electrical current upon switching the conduction among the driving coils Lu, Lv and Lw can be reduced.

Further, the use of the capacitor $C_0$ permits omission of large-scaled electrolytic capacitors and resistors, and this is a great merit from standpoints of cost and space.

Further, the inventive circuit is operative at a high speed above 2000 rpm.

Beside this, since capacitors Cu, Cv and Cw connected to the driving coils Lu, Lv and Lw are not required or may be replaced by chip-type capacitors of small capacitances (about 0.1 to 0.22 μF), the circuit space and the cost are reduced.

Since the electrolytic capacitors are not used, no through current occurs upon high rotations of the rotor. That is, the inventive circuit enables reduction of mechanical and electrical noises over a wide speed range from low to high rotations. Further, since such noises are removed by inserting the capacitor in the path of the output signal (analog signal of the current feedback amplifier $A_2$ preceding the switching transistors (before amplification), the inventive circuit behaves as the most effective filter.

Further, since high-frequency components (noise) are not imposed on the current flowing to the coils, bad influences to peripheral circuits are prevented.

The other end of the capacitor $C_0$ connected to the output terminal of the current feedback amplifier $A_2$ need not be grounded.

Figure 3:
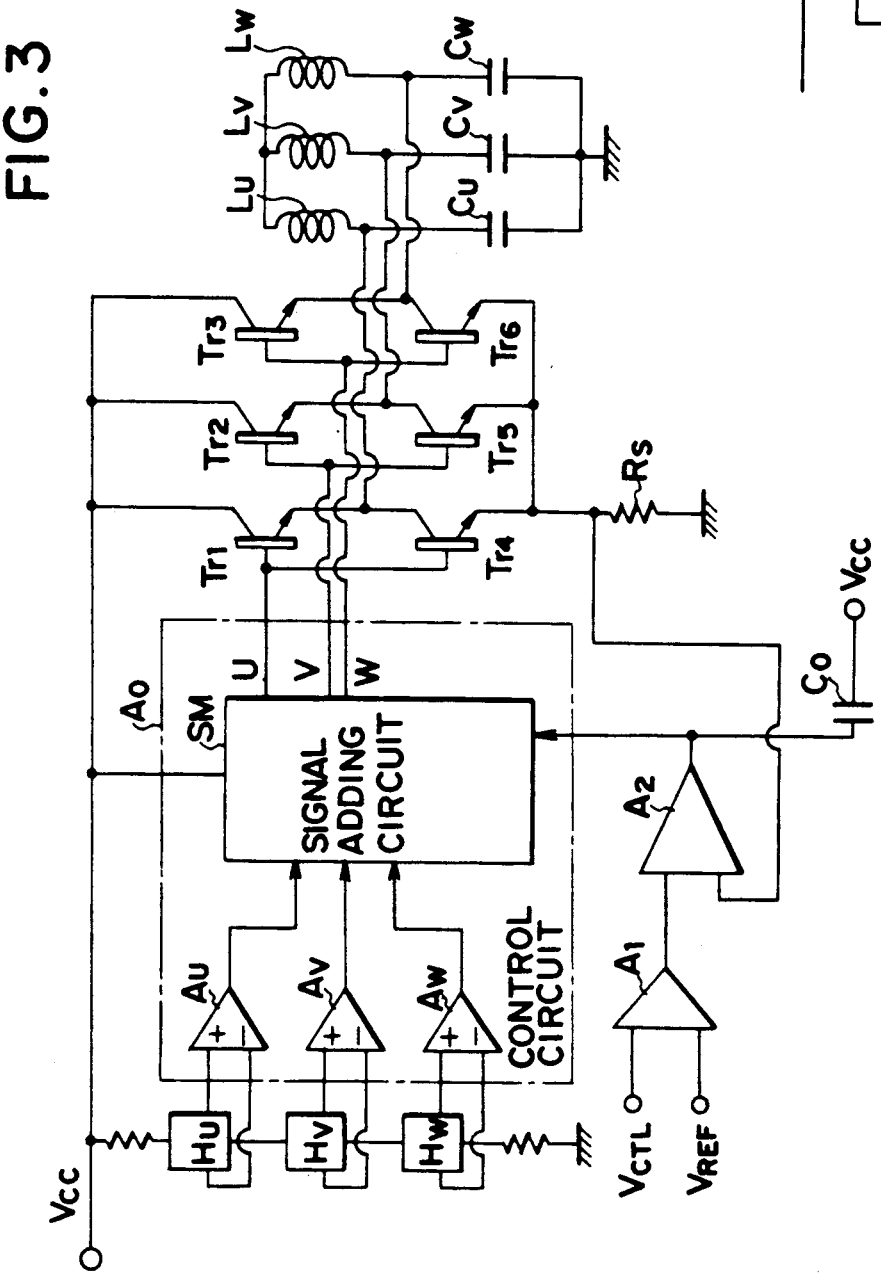

FIG. 3 shows a modified arrangement in which the other end of the capacitor $C_0$ is connected to a +power source terminal Vcc.

Figure 4:
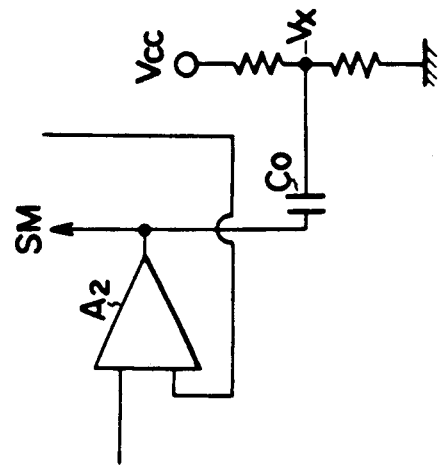

FIG. 4 shows a modified arrangement in which the other end of the capacitor $C_0$ is connected to a stabilized voltage terminal such as Vx.

There is, as a further example, an arrangement in which a capacitor is inserted in parallel with the current detection resistor Rs. However, this cannot remove the influence of the speed signal (analog signal), and its filtering effect is inferior to the aforegoing arrangements.

What is claimed is:

1. A driving circuit for a brushless motor having driving coils wound on a core opposed to a rotor magnet comprising:

magnetosensitive elements for detecting the rotating position of said motor by detecting the magnetic poles of said rotor magnet;

driving transistors for feeding power to said driving coils of said motor;

a current feedback amplifier responsive to a current detection signal obtained by detecting a current flowing in said coils and a speed signal indicative of the rotation speed of said motor and producing at an output terminal a control signal to control the amount of the current flowing in said coils;

a control circuit responsive to output signals of said magnetosensitive elements and the output of said current feedback amplifier and connected to drive said driving transistors; and first capacitor means connected between said output terminal of said current feedback amplifier and a point of constant potential, whereas the first capacitor means has a value chosen for performing the function of capacitors normally connected to said driving coils to prevent inductive transients from said driving coils from passing to said control circuit.

2. The brushless motor driving circuit according to claim 1 wherein said capacitor is connected between said output terminal of said current feedback amplifier and a grounding terminal.

3. The brushless motor driving circuit according to claim 1 wherein said first capacitor means is connected between said output terminal of said current feedback amplifier and a stabilized voltage terminal.

4. The brushless motor driving circuit of claim 1 wherein said first capacitor means includes a capacitor having a value in the range of 0.1 microfarad to 10 microfarads.

5. The brushless motor driving circuit according to claim 1 including second capacitor means connected to each of said coils and characterized by capacitance values providing negligible suppression of said inductive transients compared with the transients suppression provided by said first capacitor means.

* * * * *